US00RE34265E

United States Patent [19]

Foster et al.

[11] E Patent Number: Re. 34,265

[45] Reissued Date of Patent: May 25, 1993

[54] GROUNDWATER AZIMUTH DETECTION

[75] Inventors: John W. Foster, Normal; Lawrence J. Fryda, Bloomington, both of Ill.

[73] Assignee: Illinois State University, Normal, Ill.

[21] Appl. No.: 905,092

[22] Filed: Jun. 26, 1992

Related U.S. Patent Documents

Reissue of:

[64] Patent No.: 4,963,019
Issued: Oct. 16, 1990
Appl. No.: 386,895
Filed: Jul. 28, 1989

[51] Int. Cl.[5] ..... G01P 3/36; G01W 1/02

[52] U.S. Cl. ..... 356/28; 73/861.05; 73/861.06; 73/170.01

[58] Field of Search ..... 73/861.05, 861.06, 189; 356/28

[56] References Cited

U.S. PATENT DOCUMENTS

| | | | |
|---|---|---|---|
| 3,904,295 | 9/1975 | Hock | 356/167 |
| 4,099,870 | 7/1978 | Luzzi | 356/28 |
| 4,206,999 | 6/1980 | Keller | 356/28 |
| 4,286,872 | 9/1981 | Schneider | 356/28 |
| 4,308,753 | 1/1982 | Olson | 73/189 |
| 4,391,137 | 7/1983 | Kerfoot et al. | 73/204.22 |
| 4,396,943 | 8/1983 | Lord | 358/107 |
| 4,543,834 | 10/1985 | Hasegawa | 73/861.05 |
| 4,616,931 | 10/1986 | Studer | 356/373 |

*Primary Examiner*—Stephen C. Buczinski
*Attorney, Agent, or Firm*—Reising, Ethington, Barnard, Perry & Milton

[57] ABSTRACT

An apparatus detects the azimuth of the migration of groundwater containing suspended microscopic particles. The apparatus comprises a probe consisting of a light source which emits light in a vertical orientation and a photodigitizer which faces the light source and is separated from the light source to permit the flow of groundwater between the light source and the photodigitizer. When the probe is submerged in migrating groundwater, the eclipses of light created by the suspended microscopic particles as the groundwater passes between the light source and the photodigitizer are detected by the photodigitizer. Information from the photodigitizer is processed and then visually displayed.

28 Claims, 2 Drawing Sheets

GROUNDWATER AZIMUTH DETECTION

Matter enclosed in heavy brackets [ ] appears in the original patent but forms no part of this reissue specification; matter printed in italics indicates the additions made by reissue.

FIELD OF THE INVENTION

This invention relates to an apparatus for, and a method of, detecting the azimuth of groundwater migration.

BACKGROUND OF THE INVENTION

Groundwater is water located under the Earth's surface. It is considered to be the most precious of all geologic resources due to the fact that millions of people are dependent upon it for drinking, irrigation, and industrial purposes. Groundwater occurs naturally in the pores and fractures of rock and sediment. Although [Water] *water* contained in some materials is largely immobile, water contained in other materials is capable of migration in response to a pressure gradient. Such reservoirs of groundwater are generally known as aquifers.

Groundwater in most aquifers has a slow rate of natural movement, generally less than about 4 cm/hr. The migration of groundwater is of interest for many reasons. For example, geohydrologists study the azimuth (compass direction) of the migration and its speed because they provide information on the subterranean formation itself. But it is in the environmental area that determination of the azimuth of groundwater migration is probably most critical.

When groundwater becomes contaminated at one place, the contamination moves to other places by transport down the hydraulic gradient. Accordingly, a contaminant source (e.g., a landfill or an accidental spill of a hazardous liquid) can be a threat to persons living great distances away who rely upon uncontaminated groundwater if the groundwater has a natural movement in their direction from the contaminant source.

Determining the azimuth of groundwater migration is a required step in predicting the environmental impact of a contaminant source. The standard method of determining the azimuth of migration in an aquifer is to take hydrostatic pressure readings at known depths in three widely separated boreholes. Using either trigonometry or graphic geometry, the pressure gradient and the azimuth of fluid migration can then be calculated. The azimuth of flow is traditionally assumed to be in the same direction as the pressure gradient. This method is not exact because it assumes homogeneity of permeability in the formation, and true homogeneity of a formation's physical character is rare. More importantly, this method of determining the azimuth requires three boreholes and the drilling of such boreholes is extremely expensive. Accordingly, a simpler, faster, less expensive, and more accurate method of determining azimuth would be a tremendous advance in this science.

A device to directly determine the azimuth of groundwater migration was at one time, and may still be, commercially available. The device contained a heating element surrounded by temperature sensors. The device was submerged in the groundwater and the heating element activated. By monitoring the increase in water temperature at the sensors, the azimuth could allegedly be determined. Unfortunately, the device was apparently not commercially successful. It is believed that the necessity of complication on-site calibrations and the sensitivity required because of the minute temperature differentials involved have prevented use of the device under rugged conditions.

The use of light sources to measure the velocity of a flowing liquid has been disclosed. Keller, U.S. Pat. No. 4,206,999, issued Jun. 10, 1980, discloses an apparatus which measures the direction and speed of flow of a fluid. The apparatus uses a rectangular laser beam which is aimed at the fluid. The beam is rotated until the light reflected from entrained particles is maximized. From this information, the velocity vector is determined.

Lord, U.S. Pat. No. 4,396,943, issued Aug. 2, 1983, discloses a video flowmeter. The flowmeter includes a television camera which takes movies of entrained particles moving with a fluid in a pipe. By adjusting the raster line scanning speed of the video screen, the images of the particles can be made to appear moving slowly across the video screen. The speed of movement is then compared with speeds for which a volumetric flow rate had been measured and a volumetric flow rate is determined.

Hasegawa, U.S. Pat. No. 4,543,834, issued Oct. 1, 1985, discloses a method of measuring a fluid velocity by forming bubbles in the fluid, illuminating the fluid with a slit of light, measuring the resulting diffusion as the bubbles pass at two close points a known distance apart, and then calculating the fluid velocity from the time interval between the appearance of diffusion at the two points.

Optical light sources have also been used to detect the speed and direction of moving objects. See, for example, Hock, U.S. Pat. No. 3,904,295, issued Sep. 9, 1975; Schneider, U.S. Pat. No. 4,286,872, issued Sep. 1, 1981; and Studer, U.S. Pat. No. 4,616,931, issued Oct. 14, 1986.

However, in summary, no known method or apparatus is capable of directly and reliably measuring the azimuth of groundwater migration.

SUMMARY OF THE INVENTION

The object of this invention is to provide an improved apparatus for, and method of, measuring the azimuth of the migration of groundwater. A more particular object of this invention is to provide such an apparatus and method to permit the measurement to be made from a single borehole.

We have discovered an apparatus for detecting the azimuth of the migration of groundwater containing suspended microscopic particles. The apparatus comprises: (a) a probe comprising a light source which emits light in a vertical orientation and a photodigitizer which faces the light source and is separated from the light source to permit the flow of groundwater between the light source and the photodigitizer, such that when the probe is submerged in migrating groundwater, the eclipses of light created by the suspended microscopic particles as the groundwater passes between the light source and the photodigitizer are detected by the photodigitizer; (b) a means to determine the directional orientation of the probe when submerged in migrating groundwater; (c) a means to process the information from the photodigitizer and from the directional-orientation means; and (d) a means to visually display the azimuth of the migration of the groundwater.

We have also discovered a method of detecting the azimuth of the migration of groundwater containing suspended microscopic particles. The method comprises: (a) submerging a probe into migrating groundwater, the probe comprising a light source which emits light in a vertical orientation and a photodigitizer which faces the light source and is separated from the light source to permit the flow of groundwater between the light source and the photodigitizer so that the eclipses of light created by the suspended microscopic particles as the groundwater passes between the light source and the photodigitizer are detected by the photodigitizer; (b) determining the directional orientation of the probe; (c) processing the information from the photodigitizer and the information concerning the directional orientation of the probe; and (d) visually displaying the azimuth of the migration of the groundwater.

The apparatus and method of this invention provide a number of advantages over devices and methods currently in use. First of all, the azimuth of groundwater migration can be determined from a single borehole, thus eliminating the need to drill multiple boreholes. Secondly, the azimuth can be observed directly without the need for calculations or assumptions. Thirdly, the azimuth can be easily determined at various depths. And fourthly, the apparatus is reliable and rugged.

DETAILED DESCRIPTION OF THE INVENTION

Figure 1:
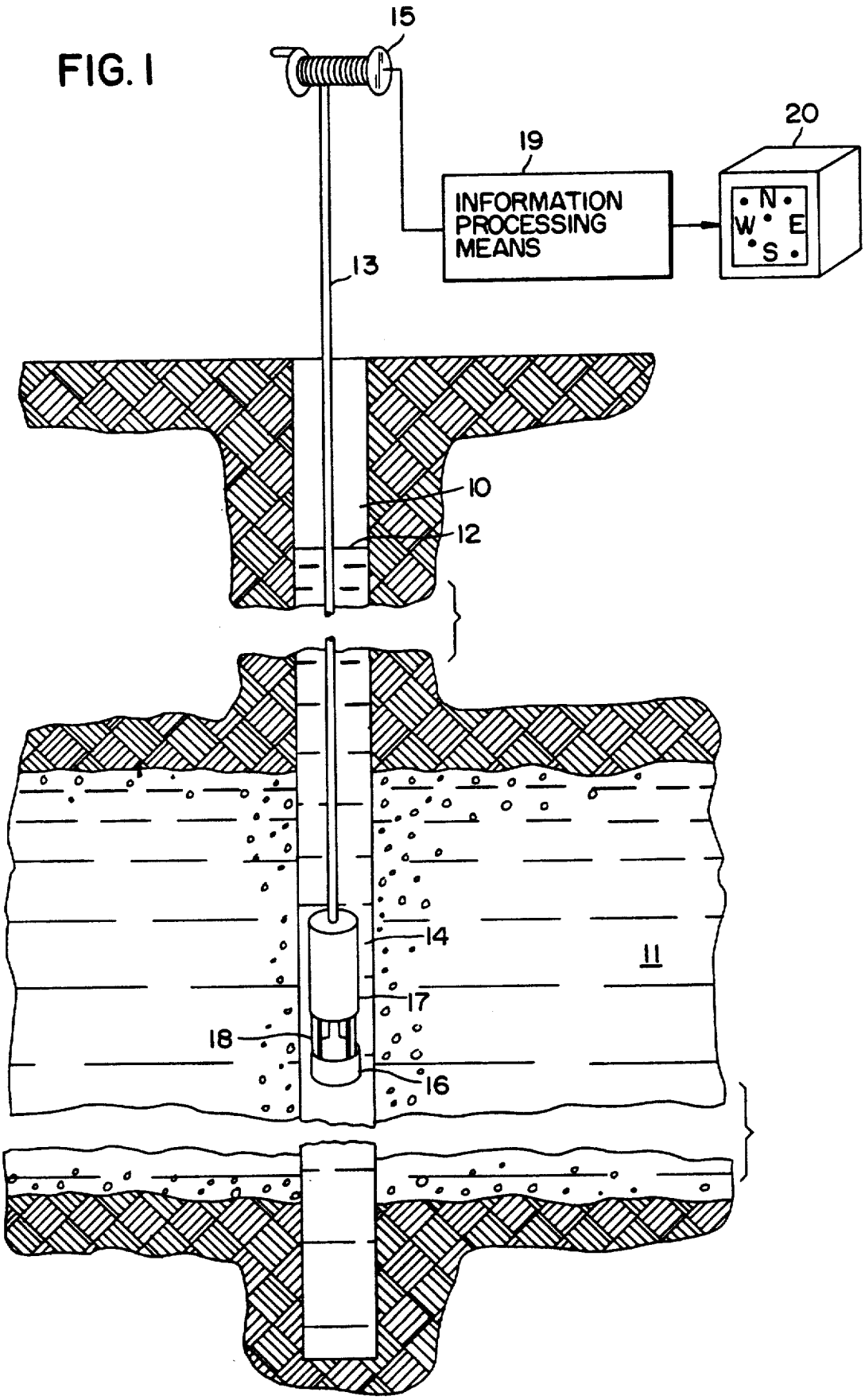
FIG. 1 is a sectional view of a borehole showing a simplified representation of the apparatus of this invention.

This invention is best understood by reference to the drawing. FIG. 1 is a sectional view of a borehole 10 extending an unspecified depth to an aquifer 11 under the Earth's surface. Groundwater from the aquifer rises in the borehole to a level 12 due to fluid pressure in the aquifer. The groundwater contains suspended microscopic particles of clay or other material (not shown) and slowly migrates in a horizontal direction. The borehole itself is conventional and is not critical to this invention.

Suspended in the aquifer by a cable 13 is a probe 14. The probe is raised or lowered with a winch 15 or other suitable means and set in position at the desired depth in the aquifer. The winch is shown suspended over the borehole for simplicity while in practice it is, of course, supported by a tripod or other supporting means.

The probe itself has two major components—a light source 16 and a photodigitizer 17. The light source and photodigitizer are separated from each other to permit the flow of groundwater between them. The light source illuminates the groundwater passing through the probe. The suspended microscopic particles in the groundwater create eclipses of light (shadows) as a result of this illumination. Any light source having sufficient intensity to be detectable by the photodigitizer is acceptable, but it is preferred that the light be monochromatic because monochromatic light makes precise shadows. Lasers are the preferred sources of monochromatic light. An example of a preferred light source is the Model HML811 helium-neon laser, a commercial product of Metro Logic Instruments, Inc., which is available from Edmund Scientific Company of Barrington, N.J.

The photodigitizer contains thousands of individual elements, each of which is capable of differentiating light from darkness. It is thus able to detect the eclipses of light created by the particles in the groundwater as it flows through the probe and is illuminated by the light source. Video cameras are capable of this type of differentiation, but they are relatively expensive and large and otherwise poorly-suited for use in a borehole. A preferred photodigitizer utilizes an opticram composed of thousands of individual image sensing elements known as pixels (picture elements). An example of such a preferred photodigitizer is the Idetix Digital Imaging System, a commercial product of the Idetix Corporation, which is available from Personal Computing Tools of Los Gatos, Calif. This product contains an opticram having two rectangular arrays of 128 by 256 pixels each, for a total of 65,536 individual elements. The presence or absence of light on each pixel produces an electrical response which can be processed and displayed as described below. The opticram has an area of about one sq. in. and the physical dimensions of the photodigitizer are approximately $2\times1\times6$ inches.

As previously mentioned, the light source and the photodigitizer are positioned in the probe to permit the flow of groundwater between them. The light source and the photodigitizer are generally separated a distance which enables an optimal number of particles to be present at any given time between the light source and the photodigitizer. If the light source and the photodigitizer are too close, there may be times when few or no particles are present in the groundwater passing between them. On the other hand, if the light source and the photodigitizer are too far apart, there may be so many particles that the most or all of the light from the light source is blocked. Furthermore, increasing the distance between these two components requires increased intensity from the light. In general, the light source and the photodigitizer are separated by about 1 to 5 cm. While the light source and photodigitizer can be permanently fixed a set distance apart, it is preferred that the mounting means permit some adjustment for varying conditions. As shown in FIG. 1, the use of brackets 18 is a convenient means of mounting. Threaded bolts are also conveniently used for mounting.

The light source and the photodigitizer are generally positioned so that the light travels in a vertical orientation when the probe is submerged in aquifer, either straight up (as shown in FIG. 1) or straight down. This positioning permits the migration of groundwater in the horizontal plane (the azimuth) to be determined. However, if the borehole diameter permits other orientations of the probe, the migration in any plane can be detected. If it is not feasible to rotate the probe itself, the use of mirrors to change the direction of the light enables the migration in other planes to be detected. If the probe is placed in a borehole, it is preferred that it be centered to reduce the effects of flow interruptions as the groundwater passes across the formation-borehole interface. Means to center the probe are well known and commonly used in the petroleum industry.

In using the probe to determine the azimuth of groundwater migration, the directional orientation of the probe itself must be known. Perhaps the simplest way of determining the probe's orientation is to attach it to a pipe, or other rigid means, with longitudinal markings on it. This enables the orientation of the probe to be determined based on the orientation of the pipe at the surface. While this method is simple, it is undesirable because the use of a pipe becomes impractical at depths of hundreds of feet. A preferred method of determining the probe's orientation downhole is to include a directional-determining means, such as a gyroscope, as part of the probe. The information from the directional-determining means, when combined with the information from the photodigitizer, provide the input necessary to determine the azimuth of groundwater flow regardless of the orientation and movement of the probe. Such directional-determining means are commercially available and are widely used in the petroleum industry. All parts of the probe, including any directional-determining means, are water-proof and otherwise impervious to the conditions encountered during use.

One of the primary purposes of the cable is to support the probe and, for this purpose, it may be constructed of any suitable material. As mentioned above, a pipe with longitudinal markings can be used to determine the probe's directional orientation. If the depth of the probe is desired to be known, a distance-calibrated cable is conveniently employed. The cable also generally performs the second purpose of conveying electrical signals and power to and from the probe. A multifilament electrical cable designed primarily for this latter purpose may have sufficient strength to support the probe and thus eliminate the need for a separate cable. On the other hand, the transmission of information to and from the probe may be accomplished by fiber optics, radio frequency, or ultrasonic means and in such situations a weight-supporting cable is generally necessary.

The information from the photodigitizer and from the directional-determining means is transmitted to an information processing means 19. [T] *The* information processing means is represented in FIG. 1 as a "black box", but generally consists of a computer and software. The information processing means transforms the information into a form suitable for transmission to the visual display means 20. The visual display means presents the information in a manner which can be directly observed by a viewer. A preferred visual display means is a computer graphics display monitor.

With the appropriate orientation and magnification, and with the placement of directional coordinates (Up being North, Right being East, etc.) on the monitor screen, the apparatus makes the detection of azimuth instantly understandable. The magnification achieved is the ratio of the diagonal dimension of the monitor screen to the actual diameter of the laser beam. A preferred magnification is about 500 to 1000 times, most preferably about 800 times. At a magnification of 800 times, a suspended microscopic particle having a diameter of 5 microns appears on the monitor screen as an image having a diameter of 0.4 cm, a readily visible size. Similarly, an actual groundwater migration velocity of 2.25 cm/hour appears on the monitor screen as a velocity of 0.5 cm/sec. Thus, the viewer sees on the monitor a movement of dark spots (as shown in FIG. 1) across the screen in the exact direction of the azimuth of the groundwater migration and can determine the azimuth in only a few seconds. In addition to the visual display, the information processed can be stored, videotaped, printed, or transmitted elsewhere.

Figure 2:
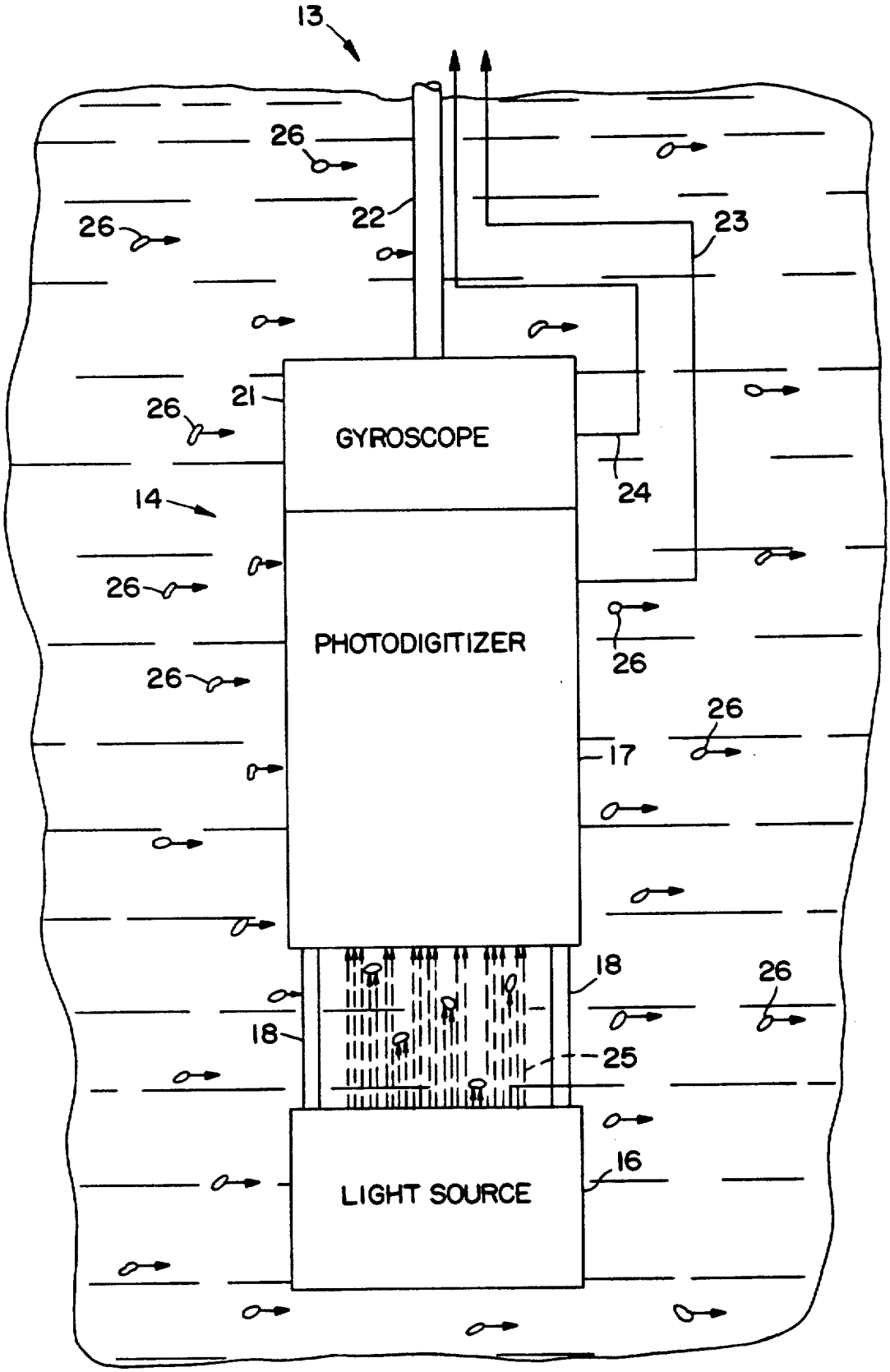
FIG. 2 is a detail of the probe component of the apparatus of the invention.

The probe 14 is shown in more detail in FIG. 2. It consists of the light source 16, the photoditizer 17, the brackets 18, and gyroscope 21. The cable 13 is shown as comprising cable 22 to support the weight of the probe, electrical line 23 for carrying information to and from the photodigitizer, and electrical line 24 for carrying information to and from the gyroscope. The light source is shown emitting light 25 straight up toward the photodigitizer. [Microscope] *Microscopic* particles 26 of clay or other material suspended in the groundwater are shown magnified many times for illustration purposes. Five such particles are shown passing between the light source and the photodigitizer where they create eclipses of light (shadows). The five moving shadows are detected by the photodigitizer and [appearing] *appear* in motion on the screen of the visual display means 20 shown in FIG. 1.

We claim:

1. An apparatus for detecting the azimuth of the migration of groundwater containing suspended microscopic particles, the apparatus comprising:

(a) a probe comprising a light source which emits light in a vertical orientation and a photodigitizer which faces the light source and is separated from the light source to permit the flow of groundwater between the light source and the photodigitizer, such that when the probe is submerged in migrating groundwater, the eclipses of light created by the suspended microscopic particles as the groundwater passes between the light source and the photodigitizer are detected by the photodigitizer;

(b) a means to determine the directional orientation of the probe when submerged in migrating groundwater;

(c) a means to process the information from the photodigitizer and from the directional-orientation means; and (d) a means to visually display the azimuth of the migration of the groundwater.

2. The apparatus of claim 1 wherein the light source comprises a laser.

3. The apparatus of claim 2 wherein the photodigitizer comprises an opticram.

4. The apparatus of claim 3 wherein the directional-orientation-determination-means comprises a gyroscope.

5. The apparatus of claim 4 wherein the visual-display-means comprises a computer graphics display monitor.

6. The apparatus of claim 5 wherein the information-processing-means comprises a computer and software.

7. A method of detecting the azimuth of the migration of groundwater containing suspended microscopic particles, the method comprising:

(a) submerging a probe into migrating groundwater, the probe comprising a light source which emits light in a vertical orientation and a photodigitizer which faces the light source and is separated from the light source to permit the flow of groundwater between the light source and the photodigitizer so that the eclipses of light created by the suspended microscopic particles as the groundwater passes between the light source and the photodigitizer are detected by the photodigitizer;

(b) determining the directional orientation of the probe;

(c) processing the information from the photodigitizer and the information concerning the directional orientation of the probe; and (d) visually displaying the azimuth of the migration of the groundwater.

8. The method of claim 7 wherein the light source of the probe comprises a laser.

9. The method of claim 8 wherein the photodigitizer of the probe comprises an opticram.

10. The method of claim 9 wherein the directional orientation of the probe is determined with a gyroscope.

11. The method of claim 10 wherein the azimuth is visually displayed on a computer graphics display monitor.

12. The method of claim 11 wherein the information is processed with a computer and software.

*13. An apparatus for detecting the azimuth of migration of groundwater, in situ, said groundwater containing suspended microscopic particles, the apparatus comprising:*

*a light source, an imaging device and a light path extending from the light source to the imaging device, the path including a path segment adapted to be occupied by said groundwater, in situ, and to be oriented in a direction transverse to the direction of said migration, whereby an image is formed by said imaging device of particles in said path segment,*

*a direction indicator coupled with said imaging device,*

*and a display device at a location remote from said path segment and being electrically coupled with said imaging device for displaying said image in a predetermined angular relation with the orientation of said imaging device,*

*whereby movement of said particles in said path segment can be viewed on said display for detecting said azimuth of migration.*

*14. The apparatus of claim 13 including:*

*a probe with said light source and said imaging device mounted therein with a supporting structure which maintains the light source and imaging device in spaced relation with each other so that groundwater, in situ, may flow therebetween, whereby said probe may be submerged as a unit in said groundwater.*

*15. The apparatus of claim 13 wherein said light source comprises a laser.*

*16. The apparatus of claim 13 wherein said light source comprises a laser and wherein said display device displays said image with magnification thereof.*

*17. The apparatus of claim 16 wherein said magnification is at least five hundred.*

*18. The apparatus of claim 13 wherein said imaging device comprises a photodigitizer.*

*19. The apparatus of claim 13 wherein said direction indicator is a gyroscope.*

*20. The apparatus of claim 13 wherein said display device is a monitor.*

*21. The apparatus of claim 19 including a computer having inputs connected with said imaging device and said direction indicator and having an output connected with said display device.*

*22. The method of detecting the azimuth of migration of groundwater, in situ, in the earth, said groundwater containing suspended microscopic particles, the method comprising:*

*submerging first and second optical elements into a body of groundwater, said elements being separated from each other and allowing said migration of groundwater, in situ, in a region between said elements,*

*emitting a beam of illumination from said first optical element into and through said region,*

*forming an image of suspended microscopic particles in said beam which is received at said second element,*

*determining the directional orientation of said second element,*

*and determining the direction of motion, relative to said orientation, of the suspended microscopic particles in said beam and the ground water containing them as an indication of said azimuth of migration.*

*23. The method of claim 22 including the step of illuminating said first optical element with a laser.*

*24. The method of claim 23 including the step of magnifying said image with a magnification of at least five hundred for the display on said display device.*

*25. The method of claim 22 wherein the step of forming an image is performed by a photodigitizer.*

*26. The method of claim 22 wherein the step of forming an image is performed by a video camera.*

*27. The method of claim 22 wherein the step of determining directional orientation is performed by a gyroscope.*

*28. The method of claim 22 wherein the step of determining the direction of motion is performed by viewing a display device which reproduces said image in a predetermined angular relation with the orientation of said second element.*

* * * * *